US007470314B2

(12) United States Patent
Valentini et al.

(10) Patent No.: US 7,470,314 B2
(45) Date of Patent: Dec. 30, 2008

(54) INKJET INK AND INK SET

(75) Inventors: Jose Esteban Valentini, West Chester, PA (US); Gregory Paul Morris, Horsham, PA (US); Sandra Laurine Issler, Newark, DE (US); James Walter Wheeler, West Chester, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 60 days.

(21) Appl. No.: 11/489,139

(22) Filed: Jul. 19, 2006

(65) Prior Publication Data

US 2007/0058016 A1    Mar. 15, 2007

Related U.S. Application Data

(60) Provisional application No. 60/716,349, filed on Sep. 12, 2005.

(51) Int. Cl.
*C09D 11/02*  (2006.01)
*B41J 2/01*  (2006.01)

(52) U.S. Cl. ............... 106/31.43; 106/31.28; 106/31.6; 106/31.9; 347/100

(58) Field of Classification Search ............. 106/31.43, 106/31.28, 31.6, 31.9; 347/100
See application file for complete search history.

(56) References Cited

U.S. PATENT DOCUMENTS

| 5,085,698 | A | | 2/1992 | Ma et al. |
| 5,091,005 | A | | 2/1992 | Mueller et al. |
| 5,116,409 | A | | 5/1992 | Moffatt |
| 5,173,112 | A | * | 12/1992 | Matrick et al. ........... 106/31.43 |
| 5,181,045 | A | | 1/1993 | Shields et al. |
| 5,231,131 | A | | 7/1993 | Chu et al. |
| 5,254,159 | A | | 10/1993 | Gundlach et al. |
| 5,258,064 | A | | 11/1993 | Colt |
| 5,488,402 | A | | 1/1996 | Shields et al. |
| 5,518,534 | A | | 5/1996 | Pearlstine et al. |
| 5,626,655 | A | * | 5/1997 | Pawlowski et al. ....... 106/31.27 |
| 5,693,129 | A | * | 12/1997 | Lin ......................... 106/31.43 |
| 5,851,274 | A | * | 12/1998 | Lin ......................... 106/31.43 |
| 5,958,120 | A | * | 9/1999 | Gundlach et al. ........ 106/31.43 |
| 5,958,121 | A | | 9/1999 | Lin |
| 6,048,390 | A | | 4/2000 | Yano et al. |
| 6,053,969 | A | | 4/2000 | Lauw et al. |
| 6,054,505 | A | * | 4/2000 | Gundlach et al. ........... 523/160 |
| 6,852,156 | B2 | | 2/2005 | Yeh et al. |
| 6,899,754 | B2 | * | 5/2005 | Yeh et al. .................... 106/31.6 |
| 7,279,032 | B2 | * | 10/2007 | Wheeler et al. ........... 106/31.27 |
| 7,296,885 | B2 | * | 11/2007 | Doi ............................. 347/100 |

FOREIGN PATENT DOCUMENTS

EP    0 556 649    8/1993

OTHER PUBLICATIONS

PCT International Search Report for International Application No. PCT/US2006/035413 dated Nov. 22, 2006.

* cited by examiner

*Primary Examiner*—Helene Klemanski

(57) ABSTRACT

The present invention pertains to an inkjet ink comprising performance additives and to an ink set comprising this ink, wherein the performance additives alleviate bleed in multi-color printed elements.

10 Claims, No Drawings

INKJET INK AND INK SET

CROSS-REFERENCE TO RELATED APPLICATION

This application claims priority under 35 U.S.C. §119 from U.S. Provisional Application Ser. No. 60/716,349, filed Sep. 12, 2005.

BACKGROUND OF THE INVENTION

The present invention pertains to an inkjet ink comprising performance additives and to an ink set comprising this ink wherein the performance additives alleviate bleed in multi-color printed elements.

Inkjet printing is a non-impact printing process in which droplets of ink are deposited on a substrate, such as paper, to form the desired image. The droplets are ejected from a printhead in response to electrical signals generated by a microprocessor.

Bleed is a particular problem in ink jet printing because the relatively low viscosity inks used therein tend to spread and because ink jet printers have the capability of printing three or four primary colors in simultaneous (or near simultaneous) fashion.

Various methods have been proposed to prevent bleed of adjacent printing liquids. One method is to apply the two printing liquids at a distance from one another such that no intermingling or mixing of the printing liquids can occur. This method is not a solution to the problem, however, and produces images having poor resolution.

Another method involves delay in applying the second printing liquid until the first printing liquid is completely dry. This method is also disadvantageous, not only because of its inefficiencies, but also because it is not entirely effective.

U.S. Pat. No. 5,091,005 teaches that the addition of formamide to the inks will reduce the occurrence of bleed in some circumstances.

Yet another approach to control bleed is to increase the rate of penetration of the printing liquid into the substrate, but this tends to reduce the optical density.

U.S. Pat. No. 5,116,409 discloses the use of zwitterionic surfactants or nonionic amphiphiles in concentrations above their respective critical micelle concentration. The formation of micelles containing dye molecules is said to prevent the dye molecules in each ink from mixing.

U.S. Pat. No. 5,181,045 teaches a method of ink jet printing wherein one of inks contains a dye that becomes insoluble under defined pH conditions and the other ink has a pH that renders the dye contained in the first ink insoluble.

U.S. Pat. No. 5,488,402 discloses a method for preventing color bleed between two different color ink compositions wherein the first ink is anionic and comprises a coloring agent which includes one or more carboxyl and/or carboxylate groups, and the second ink includes a precipitating agent which is designed to ionically crosslink with the coloring agent in the first ink to form a solid precipitate in order to prevent bleed between the two ink compositions. Multivalent metal salts are disclosed as being useful as the precipitating agent.

U.S. Pat. No. 5,518,534 discloses an ink set for alleviating bleed in multicolor printed elements employing a first ink and a second ink, each containing an aqueous carrier medium and a colorant; the colorant in the first ink being a pigment dispersion and the second ink containing a salt of an organic acid or mineral acid having a solubility of at least 10 parts in 100 parts of water at 25° C., wherein the salt is present in an amount effective to alleviate bleed between the first and second inks.

All of the above-identified publications are incorporated by reference herein for all purposes as if fully set forth.

The known methods of controlling bleed have various advantages and drawbacks, and there is still a need for alternative bleed control methods.

SUMMARY OF THE INVENTION

It has now been found that a combination of certain polyamines and soluble monovalent metal salt is effective as a performance additive in an aqueous dye ink to control bleed when the dye ink is printed in contact with an aqueous anionic pigmented ink.

Accordingly, in one aspect the present invention pertains to an aqueous dye ink for inkjet printing comprising:

an aqueous vehicle, a dye colorant, a monomeric or oligomeric organic amine containing at least two and up to six amino groups ("polyamine"), and a monovalent metal ($M^{+1}$) salt, wherein the dye colorant, amine and salt are substantially soluble in the aqueous vehicle.

Preferred polyamines include, for example, 1,3-diamino-2-hydroxypropane, 1,4-diaminobutane, tetraethylenepentanamine and 1,2-diaminoethane(ethylene diamine). Polyamines include the unnuetralized form, as well as partially and or fully neutralized forms.

Monovalent metal salt includes salts of lithium, sodium, potassium, rubidium and cesium.

In another aspect, the present invention pertains to an inkjet ink set comprising at least a first ink and second ink wherein said first ink is an aqueous pigment ink comprising anionically stabilized pigment dispersed in an aqueous vehicle, and said second ink is the aqueous dye ink as described above.

The present invention further includes a method for ink jet printing onto a substrate, comprising the steps of:

(a) providing an ink jet printer that is responsive to digital data signals;

(b) loading the printer with a substrate to be printed;

(c) loading the printer with an inkjet ink or inkjet ink set forth above and as described in further detail below; and (d) printing onto the substrate using the inkjet ink set in response to the digital data signals.

A preferred substrate is plain paper.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION OF THE PREFERRED EMBODIMENTS

As indicated above, the aqueous dye inks in accordance with the present invention generally comprise an aqueous vehicle, a colorant (dye) soluble in the aqueous vehicle, and the polyamine/metal salt additive combination.

Aqueous Vehicle

The ink vehicle is the carrier (or medium) for the colorant. An "aqueous vehicle" refers to a vehicle comprised of water or a mixture of water and at least one water-soluble organic solvent (co-solvent) or humectant. Selection of a suitable mixture depends on requirements of the specific application, such as desired surface tension and viscosity, the selected colorant, and compatibility with substrate onto which the ink will be printed.

Examples of water-soluble organic solvents and humectants include: alcohols, ketones, keto-alcohols, ethers and others, such as thiodiglycol, sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether; urea and substituted ureas.

An aqueous vehicle will typically contain about 30% to about 95% water with the balance (i.e., about 70% to about 5%) being the water-soluble solvent. Ink compositions typically contain about 60% to about 95% water, based on the total weight of the aqueous vehicle.

Polyamine

Polyamines are defined as monomeric or oligomeric organic amines containing at least two and up to six amino groups. The amino groups can be primary, secondary or tertiary amino groups, as well as mixtures thereof. Preferred polyamines include, for example, 1,3-diamino-2-hydroxypropane, 1,4-diaminobutane, tetraethylenepentamine and 1,2-diaminoethane(ethylene diamine), as well as mixtures thereof.

Because the polyamine in and of itself is basic, the polyamine may be used in unnuetralized form, or partially or fully neutralized form, to adjust or maintain the overall ink pH in a desired ranged. Neutralization can be done in any manner well known to those of ordinary skill in the relevant art, for example, by the use of a mineral or organic acid such as described below for the metal salt.

The polyamine is preferably present at a concentration in the range of from about 0.05 wt % to about 1.5 wt % and, more typically, from about 0.1 wt % to 1.0 wt %, based on the total weight of the ink. Polyamine weight percent is based on the weight of the polyamine in unneutralized form.

Metal Salt

Suitable metal salts for use in the present invention are monovalent metal salts that are soluble in the ink vehicle. The amount of salt present is expressed on a monovalent metal cation, $M^{+1}$, basis in parts per million (ppm), that is, parts by weight of $M^{+1}$ per million weight of ink. The amount of $M^{+1}$ present is generally in the range of from about 1000 ppm to about 15,000 ppm and, more typically, from about 3000 ppm to about 11,000 ppm.

The metal salt can be the salt of a mineral or organic acid, the selection of which is readily achieved through routine experimentation. The mineral acid may be, for example, hydrochloric acid, phosphoric acid, sulfuric acid, hydrobromic acid, nitric acid, hydriodic acid or hydrofluoric acid. The organic acids may be carboxylic acids, particularly those carboxylic acids substituted with electron withdrawing groups, and organic sulfonic acids. Some examples of such acids include chloroacetic acid, p-toluene sulfonic acid, sulfanilic acid and benzene sulfonic acid.

The monovalent metal cations can be any suitable $M^{+1}$ cation including the alkali metals $Na^{+1}$, $Li^{+1}$, $K^{+1}$, $Rb^{+1}$ and $Cs^{+1}$. Preferred is $Na^{+1}$.

Dye Colorant

Dyes can be any suitable dye. Sources of dyes are generally well known to those skilled in the relevant art. Preferred dyes include AB9, RB72, DB307, AR249, AR52, AY23, AY17, DY86, DY132, DY173, RY181 and AO33. Reference to the preceding dyes is made by "C.I." designation established by Society Dyers and Colourists, Bradford, Yorkshire, UK and published in the *The Color Index*, Third Edition, 1971.

Also preferred is a magenta dye with CAS Number 182061-89-8 (available from Ilford Imaging Group as Ilford M377) and a yellow dye with CAS Number 187674-70-0 (available from Ilford Imaging Group as Ilford Y104). The structure of CAS Number 182061-89-8 and CAS Number 187674-70-0 can be seen from Magenta Formula II and Yellow Formula I, respectively, in previously incorporated U.S. Pat. No. 6053969.

Mixtures of one or more of the above dyes is also suitable.

Additives

Other ingredients (additives) may be formulated into the inkjet ink, to the extent that such other ingredients do not interfere with the stability and jetablity of the finished ink, which may be readily determined by routine experimentation. Such other ingredients are in a general sense well known in the art.

Commonly, surfactants are added to the ink to adjust surface tension and wetting properties. Suitable surfactants include ethoxylated acetylene diols (e.g. Surfynols® series from Air Products), ethoxylated primary (e.g. Tomadol® series from Tomah Products) and secondary (e.g. Tergitol® series from Union Carbide) alcohols, sulfosuccinates (e.g. Aerosol® series from Cytec), organosilicones (e.g. Silwet® series from GE Silicons) and fluoro surfactants (e.g. Zonyl® series from DuPont). Surfactants are typically used in the amount of about 0.01 to about 5% and preferably about 0.2 to about 2%, based on the total weight of the ink.

Polymers may be added to the ink to improve durability. The polymers can be soluble in the vehicle or dispersed (e.g. "emulsion polymer" or "latex"), and can be ionic or nonionic. Useful classes of polymers include acrylics, styrene-acrylics and polyurethanes.

Biocides may be used to inhibit growth of microorganisms. Buffers may be used to maintain pH. Buffers include, for example, tris(hydroxymethyl)-aminomethane ("Trizma" or "Tris").

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N",N"-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Proportions of Ingredients

The components described above can be combined to make an ink in various proportions and combinations in order to achieve desired ink properties, as generally described above, and as generally recognized by those of ordinary skill in the art. Some experimentation may be necessary to optimize inks for a particular end use, but such optimization is generally within the ordinary skill in the art.

The amount of vehicle in an ink is typically in the range of about 70% to about 99.8%, and more typically about 80% to about 99%. Colorant is generally present in amounts up to about 10%. Percentages are weight percent of the total weight of ink.

Other ingredients (additives), when present, generally comprise less than about 15% by weight, based on the total weight of the ink. Surfactants, when added, are generally in the range of about 0.2 to about 3% by weight based on the total weight of the ink. Polymers can be added as needed, but will generally be less than about 15% by weight based on the total weight of the ink.

Ink Properties

Drop velocity, separation length of the droplets, drop size and stream stability are greatly affected by the surface tension and the viscosity of the ink. Ink jet inks typically have a surface tension in the range of about 20 dyne/cm to about 70 dyne/cm at 25° C. Viscosity can be as high as 30 cP at 25° C., but is typically somewhat lower. The ink has physical properties are adjusted to the ejecting conditions and printhead design. The inks should have excellent storage stability for long periods so as not clog to a significant extent in an ink jet apparatus. Further, the ink should not corrode parts of the ink jet printing device it comes in contact with, and it should be essentially odorless and non-toxic. Preferred pH for the ink is in the range of from about 6.5 to about 8.

Ink Set

An ink set refers to two or more individual inks intended for use jointly in a given printer. In one aspect, the present invention pertains to an ink set comprising at least two differently colored inks, more preferably at three differently colored inks (such as CMY), and still more preferably at least four differently colored inks (such as CMYK), wherein at least one of the inks is an aqueous dye ink as prescribed herein. In addition to the typical CMYK inks, the ink sets in accordance with the present invention may further comprise one or more "gamut-expanding" inks, including different colored inks such as an orange ink, a green ink, a red ink and/or a blue ink, and combinations of full strength and light strengths inks such as light cyan and light magenta.

In another aspect, the present invention pertains to an ink set comprising at least two inks wherein one of the two inks is an aqueous dye ink as prescribed herein and the second of the two inks is an aqueous anionic pigment ink. Preferably, the ink set comprises at least four inks, wherein three of the inks are aqueous dye inks as described above (such as CYM), and the fourth ink is an aqueous anionic black pigment ink.

Aqueous Anionic Pigment Ink

The aqueous anionic pigment ink comprises an aqueous vehicle, an insoluble colorant (pigment) stably dispersed therein and, optionally, other well-known types of other ingredients (additives) such as described above. The pigment can be any suitable pigment but, when employed in an ink set according to the present invention, will generally be a black pigment, preferably carbon black.

Pigments, traditionally, are stabilized to dispersion in a vehicle by dispersing agents, such as polymeric dispersants or surfactants. More recently though, so-called "self-dispersible" or "self-dispersing" pigments (hereafter "SDP(s)") have been developed. As the name would imply, SDPs are dispersible in water, or aqueous vehicle, without dispersants. Thus, pigment may be stabilized to dispersion by surface treatment to be self-dispersing (see, for example, U.S. Pat. No. 6,852,156, the disclosure of which is incorporated by reference herein for all purposes as if fully set forth), by treatment with dispersant in the traditional way, or by some combination of surface treatment and dispersant.

Preferably, when dispersant is employed, the dispersant(s) is a random or structured polymeric dispersant. Preferred random polymers include acrylic polymer and styrene-acrylic polymers. Most preferred are structured dispersants which include AB, BAB and ABC block copolymers, branched polymers and graft polymers. Some useful structured polymers are disclosed in U.S. Pat. No. 5,085,698, EP-A-0556649 and U.S. Pat. No. 5,231,131 (the disclosures of which are incorporated by reference herein for all purposes as if fully set forth).

The dispersant or surface treatment applied to the pigment creates an anionic surface charge ("anionic pigment dispersion"). Preferably, that surface charge is imparted predominately by ionizable carboxylic acid (carboxylate) groups.

Useful pigment particle size is typically in the range of from about 0.005 micron to about 15 micron. Preferably, the pigment particle size should range from about 0.005 to about 5 micron, more preferably from about 0.005 to about 1 micron, and most preferably from about 0.005 to about 0.3 micron.

Method of Printing

The inks and ink sets of the present invention can be printed with any suitable inkjet printer. The substrate can be any suitable substrate, but the instant invention is particularly useful for printing on paper and, more especially, "plain" paper. Plain paper is generally less expensive than "inkjet" paper and typically lacks any special additives that enhance print properties such as bleed control bleed. But even within the plain paper category there are differences in performance with regard to bleed. The present invention allows good quality prints to be obtained independent of the paper chosen. Examples of plain paper commonly available are Xerox 4024 (Xerox Corporation) and Hammermill Copy Plus (International Paper).

EXAMPLES

Water was deionized unless otherwise stated. Ingredient amounts are in weight percent of the total weight of ink, except where noted. Aerosol® OT is a surfactant from Cytek. Byk® 348 is a surfactant from Byk Chemie. Tomadol® 45-7 is a surfactant from Tomah Products. Dowfax® 8390 is a surfactant from Dow Chemical Co. Proxel® GXL is a biocide from Avecia.

Ilford M377 refers to a magenta dye with CAS Number 182061-89-8 and Ilford Y104 refers to a yellow dye with CAS Number 187674-70-0, both of which are available from Ilford.

Ink Preparation

In the examples that follow, inks were prepared by mixing the indicated ingredients together and filtering the resulting solution. The polyamines were neutralized with nitric acid to a pH of about 6.2 prior to addition to the rest of the ink. The following abbreviations are used in reference to the neutralized polyamines:

neutralized 1,3-diamino-2-hydroxypropane is abbreviated DAHP/HNO$_3$;

neutralized tetraethylenepentanamine is abbreviated TEPA/HNO$_3$;

neutralized 1,4-diaminobutane is abbreviated DABu/HNO$_3$; and, neutralized 1,2-diaminoethane is abbreviated EDA/HNO$_3$.

The amount of polyamine listed is based on the unneutralized material. The pH of the final inks was between about 7 and about 8.

The dyes used were "inkjet grade" meaning that they were relatively pure and free of extraneous salts. The amount of salt introduced by the dyes was minimal, and the salt level in the finished inks comes predominately from the deliberately added salt. In commercial operation, however, extraneous salt commonly found in dyes may not need to be removed and could be part of the overall salt content.

Bleed Evaluation.

A print comprising text and lines of different thickness is made with a Hewlett Packard 6122 inkjet printer on Xerox 4024 plain paper. Once images are printed with all colors, intercolor bleed between letters and/or lines and the adjacent background is compared to pre-printed standards with bleed control levels between 0.5 and 4.0. Level 4 is the best rating and indicates the color bleed is nil and the image quality is sharp and comparable to a laser printer. A rating of 0.5 indicates severe bleed as evidenced by very ragged borders.

For each ink, the test is run on three different sheets of paper, each of which is evaluated and the reported rating is an average of the three.

Underprint OD

Some printers have print modes where colored ink (cyan, magenta and/or yellow) is underprinted in areas where black ink is to be printed in order to enhance the black optical density. However, the colored inks must be formulated properly to prevent black ink from penetrating the media, otherwise underprinting can actually decrease optical density (OD) rather than increase it.

To evaluate underprint OD, a solid block of black color was printed with a Hewlett-Packard 6122 inkjet printer on Xerox 4024 plain paper using the "Fast Normal" print mode. In this print mode, the print driver employed underprinting. Confirmation of underprinting could be determined by covering the nozzles of the black pen with tape and printing the same image. If color underprint was operative, the image appeared gray instead of a black, resulting from the mixed CYM inks in the absence of the black ink.

The underprint OD of the printed black block was measured using a standard densitometer, in this case a Spectroeye from Gretag-MacBeth.

Example 1

The yellow ink compositions of this example were evaluated for bleed against the original equipment manufacturer black ("OEM black") ink supplied with the HP 6122 printer, which was a carbon black pigment ink. The underprint OD samples for each of the yellow inks were all made in combination with the same OEM black ink, underprint cyan ink and underprint magenta inks.

Bleed was very bad without additives in the dye ink. Polyamine alone could alleviate bleed but was ineffective for underprinting. Metal salt alone, at the levels employed, did essentially nothing for bleed control but helped with underprint OD. The combination of metal salt and polyamine alleviated bleed while maintaining good underprint performance.

| | Ink A Comp. | Ink B Comp. | Ink C Comp. | Ink D Comp. | Ink E Comp. | Ink F Comp. | Ink 1 | Ink 2 | Ink 3 | Ink 4 | Ink 5 | Ink 6 |
|---|---|---|---|---|---|---|---|---|---|---|---|---|
| Ingredients | | | | | | | | | | | | |
| ILFORD Y104 | 3.82 | 3.82 | 3.82 | 3.82 | 3.82 | 3.82 | 3.82 | 3.82 | 3.82 | 3.82 | 3.82 | 3.82 |
| AY23 | 0.39 | 0.39 | 0.39 | 0.39 | 0.39 | 0.39 | 0.39 | 0.39 | 0.39 | 0.39 | 0.39 | 0.39 |
| 2-Pyrrolidone | 8.0 | 8.0 | 8.0 | 8.0 | 8.0 | 8.0 | 8.0 | 8.0 | 8.0 | 8.0 | 8.0 | 8.0 |
| 1,6-Hexanediol | 8.0 | 8.0 | 8.0 | 8.0 | 8.0 | 8.0 | 8.0 | 8.0 | 8.0 | 8.0 | 8.0 | 8.0 |
| Aerosol ® OT | 0.25 | 0.25 | 0.25 | 0.25 | 0.25 | 0.25 | 0.25 | 0.25 | 0.25 | 0.25 | 0.25 | 0.25 |
| Byk ® 348 | 0.2 | 0.2 | 0.2 | 0.2 | 0.2 | 0.2 | 0.2 | 0.2 | 0.2 | 0.2 | 0.2 | 0.2 |
| Trimethylolpropane | 8.0 | 8.0 | 8.0 | 8.0 | 8.0 | 8.0 | 8.0 | 8.0 | 8.0 | 8.0 | 8.0 | 8.0 |
| DAHP/HNO$_3$ | 0 | 0.3 | 1.0 | — | — | — | 0.3 | 0.3 | 0.3 | 1.0 | 1.0 | 1.0 |
| NaCl (as ppm Na) | — | — | — | 3000 | 8000 | 11000 | 3000 | 8000 | 11000 | 3000 | 8000 | 11000 |
| Water to 100% | Bal. to 100% | Bal. to 100% | Bal. to 100% | Bal. to 100% | Bal. to 100% | Bal. to 100% | Bal. to 100% | Bal. to 100% | Bal. to 100% | Bal. to 100% | Bal. to 100% | Bal. to 100% |
| Properties | | | | | | | | | | | | |
| Bleed | 1.17 | 2.05 | 2.79 | 1.33 | 1.5 | 1.50 | 2.04 | 2.38 | 2.04 | 3.00 | 2.58 | 2.67 |
| Underprint OD | 1.15 | 1.17 | 1.28 | 1.25 | 1.27 | 1.30 | 1.30 | 1.35 | 1.32 | 1.33 | 1.37 | 1.33 |

The following cyan and magenta inks were used for the underprint tests with the above yellow inks. The cyan ink contained no performance additives; the magenta ink contained the inventive performance additives.

| Ingredients | Underprint Cyan | Underprint Magenta |
|---|---|---|
| DB199 | 2.04 | — |
| AB9 | 0.78 | — |
| Ilford M377 | — | 2.96 |
| AR52 | — | 0.62 |
| 2-Pyrrolidone | 7.5 | 8.0 |
| 1,6-Hexanediol | 13.5 | 8.0 |
| Aerosol ® OT | 0.25 | 0.25 |
| Byk ® 348 | 0.2 | 0.2 |
| Trimethylolpropane | 8.0 | 8.0 |
| DAHP/HNO$_3$ | — | 0.3 |
| NaCl (as ppm Na) | — | 8000 |
| Water | Balance to 100% | Balance to 100% |

Example 2

The inks of this example illustrate several different polyamines, and KCl as the salt.

|  | Ink G (Comp) | Ink H (Comp) | Ink 7 | Ink 8 | Ink 9 | Ink 10 | Ink 11 |
|---|---|---|---|---|---|---|---|
| Ingredients |  |  |  |  |  |  |  |
| ILFORD Y104 | 3.82 | 3.82 | 3.82 | 3.82 | 3.82 | 3.82 | 3.82 |
| AY23 | 0.39 | 0.39 | 0.39 | 0.39 | 0.39 | 0.39 | 0.39 |
| 2-Pyrrolidone | 8.0 | 8.0 | 8.0 | 8.0 | 8.0 | 8.0 | 8.0 |
| 1,6-Hexanediol | 8.0 | 8.0 | 8 | 8.0 | 8.0 | 8.0 | 8.0 |
| Aerosol ® OT | 0.25 | 0.25 | 0.25 | 0.25 | 0.25 | 0.25 | 0.25 |
| Byk ® 348 | 0.2 | 0.2 | 0.2 | 0.2 | 0.2 | 0.2 | 0.2 |
| Trimethylolpropane | 8.0 | 8.0 | 8.0 | 8.0 | 8.0 | 8.0 | 8.0 |
| DAHP/$HNO_3$ | — | 0.3 | 0.3 | 0.3 | — | — | — |
| TEPA/$HNO_3$ | — | — | — | — | 0.63 | — | — |
| DABu/$HNO_3$ | — | — | — | — | — | 0.53 | — |
| EDA/$HNO_3$ | — | — | — | — | — | — | 0.44 |
| NaCl (as ppm Na) | — | — | 7900 | — | 7900 | 7900 | 7900 |
| KCl (as ppm K) | — | — | — | 13600 | — | — | — |
| Water | Bal. to 100% | Bal. to 100% | Bal. to 100% | Bal. to 100% | Bal. to 100% | Bal. to 100% | Bal. to 100% |
| Properties |  |  |  |  |  |  |  |
| Bleed (avg) | 1.8 | 2.2 | 2.3 | 2.3 | 2.5 | 2.1 | 2.3 |

Example 3

The inks of this example illustrate that monoamine tris (hydroxymethyl)-aminomethane in place of polyamine is ineffective at bleed control.

|  | Ink I (Comp) | Ink 12 | Ink J (Comp) |
|---|---|---|---|
| Ingredients |  |  |  |
| RY181 | 1.37 | 1.37 | 1.37 |
| AY17 | 3.00 | 3.00 | 3.00 |
| 2-Pyrrolidone | 8.0 | 8.0 | 8.0 |
| 1,6-Hexanediol | 8.0 | 8.0 | 8.0 |
| Aerosol ® OT | 0.25 | 0.25 | 0.25 |
| Byk ® 348 | 0.2 | 0.2 | 0.2 |
| Trimethylolpropane | 8.0 | 8.0 | 8.0 |
| DAHP/$HNO_3$ | — | 0.3 | — |
| Tris(hydroxymethyl)amino methane | — | — | 0.5 |
| NaCl (as ppm Na) | 8000 | 8000 | 8000 |
| Water | Bal. to 100% | Bal. to 100% | Bal. to 100% |
| Properties |  |  |  |
| Bleed | 1.55 | 2.35 | 1.75 |

Example 4

The inks of this example illustrate what appears to be nearly perfect bleed control (rating of 4) with huge levels of calcium salt (24000 ppm $Ca^{2+}$) relative to no performance additives and to the inventive performance additives.

|  | Ink K (Comp) | Ink 13 | Ink L (Comp) |
|---|---|---|---|
| Ingredients |  |  |  |
| AY23 | 2.0 | 2.0 | 2.0 |
| 2-Pyrrolidone | 6.1 | 6.1 | 6.1 |
| 1,6-Hexanediol | 11.0 | 11.0 | 11.0 |
| Aerosol ® OT | 0.19 | 0.19 | 0.19 |
| Byk ® 348 | 0.2 | 0.2 | 0.2 |
| Trimethylolpropane | 8.0 | 8.0 | 8.0 |
| DAHP/$HNO_3$ | — | 0.3 | — |
| NaCl (as ppm Na) | — | 7900 | — |
| $Ca(NO_3)_2$ (as ppm Ca) | — | — | 24000 |
| Water | Bal. to 100% | Bal. to 100% | Bal. to 100% |
| Properties |  |  |  |
| Bleed (avg) | 1.7 | 2.5 | 4.0 |

Example 5

The inks of this example illustrate use of other dyes and different sodium salts.

|  | Ink M (Comp) | Ink 14 | Ink 15 | Ink N (Comp) | Ink 16 | Ink 17 |
|---|---|---|---|---|---|---|
| Ingredients |  |  |  |  |  |  |
| ILFORD Y104 | 2.74 | 2.74 | 2.74 | — | — | — |
| AY17 | 1.83 | 1.83 | 1.83 | — | — | — |
| ILFORD M377 | — | — | — | 3.12 | 3.12 | 3.12 |
| AR52 | — | — | — | 0.65 | 0.65 | 0.65 |
| 2-Pyrrolidone | 6.1 | 6.1 | 6.1 | 6.1 | 6.1 | 6.1 |
| 1,6-Hexanediol | 11.0 | 11.0 | 11.0 | 11.0 | 11.0 | 11.0 |
| Aerosol ® OT | 0.25 | 0.25 | 0.25 | 0.25 | 0.25 | 0.25 |
| Byk ® 348 | 0.2 | 0.2 | 0.2 | 0.2 | 0.2 | 0.2 |
| Trimethylol-propane | 8.0 | 8.0 | 8.0 | 8.0 | 8.0 | 8.0 |
| DAHP/$HNO_3$ | — | 0.3 | 0.3 | — | 0.3 | 0.3 |
| NaCl (as ppm Na) | — | 7900 | — | — | 7900 | — |
| $NaNO_3$ (as ppm Na) | — | — | 7900 | — | — | 7900 |

-continued

| | Ink M (Comp) | Ink 14 | Ink 15 | Ink N (Comp) | Ink 16 | Ink 17 |
|---|---|---|---|---|---|---|
| Water | Bal. to 100% | Bal. to 100% | Bal. to 100% | Bal. to 100% | Bal. to 100% | Bal. to 100% |
| Properties | | | | | | |
| Bleed (avg) | 1.8 | 2.7 | 2.5 | 2.6 | 3.3 | 2.6 |

| | Ink P (Comp) | Ink 18 |
|---|---|---|
| Ingredients | | |
| DY132 | 2.2 | 2.0 |
| DY-86 | 1.0 | 1.0 |
| 2-Pyrrolidone | 6.1 | 6.1 |
| 1,6-Hexanediol | 11.0 | 11.0 |
| Aerosol ® OT | 0.25 | 0.25 |
| Byk ® 348 | 0.2 | 0.2 |
| Trimethylolpropane | 8.0 | 8.0 |
| Water | Bal. to 100% | Bal. to 100% |
| DAHP/HNO$_3$ | — | 0.3 |
| TEPA/HNO$_3$ | — | — |
| NaCl (as ppm Na) | — | 7900 |
| Properties | | |
| Bleed (avg) | 2.0 | 2.4 |

Example 6

The inks of this example illustrate use of other dyes. All jet well and are stable to the presence of the performance additives.

| Ingredients | Ink 19 | Ink 20 |
|---|---|---|
| AY17 | 3.8 | — |
| RY181 | — | — |
| AO33 | 0.2 | — |
| RB72 | — | 2.55 |
| AB9 | — | 0.90 |
| 2-Pyrrolidone | 12.0 | 15.0 |
| 1,5-Pentanediol | 6.5 | 8.0 |
| Trimethylolpropane | 8.0 | 8.0 |
| Dowfax ® 8390 | 0.5 | 0.5 |
| Tomadol ® 45-7 | 1.0 | 0.6 |
| DAHP/HNO$_3$ | 0.3 | 0.3 |
| NaNO$_3$(as ppm Na) | 8100 | 8100 |
| Proxel ® GXL | 0.2 | 0.2 |
| Water | Bal. to 100% | Bal. to 100% |

The invention claimed is:

1. An inkjet ink set comprising at least a first ink and second ink wherein:
    said first ink is an aqueous pigment ink comprising an anionically stabilized pigment dispersed in an aqueous vehicle, and
    said second ink is an aqueous dye ink comprising:
    an aqueous vehicle,
    a dye colorant,
    an organic amine selected from the group consisting of 1,3-diamino-2-hydroxypropane, 1,4-diaminobutane, tetraethylenepentanamine, 1,2-diaminoethane and combinations thereof, and
    a monovalent metal salt,
    wherein the dye colorant, amine and salt are substantially soluble in the aqueous vehicle of said second ink.

2. The ink set of claim 1, wherein the amount of dye colorant in the second ink is from about 0.1 wt % to about 10 wt %, and the amount of amine in the second ink is from about 0.05 wt % to about 1.5 wt %, based on the total weight of the second ink.

3. The ink set of claim 1, wherein the monovalent metal of the salt in the second ink is selected from the group consisting of lithium, sodium, potassium, rubidium, cesium and mixtures thereof.

4. The ink set of claim 1, wherein the amount of monovalent metal in the second ink is from about 1000 to about 15000 parts of M$^{+1}$ per million parts of ink by weight.

5. The ink set of claim 1, wherein the dye in the second ink is selected from the group consisting of AB9, RB72, DB307, AR249, AR52, AY23, AY17, DY86, DY132, DY173, RY181, AO33, CAS Number 182061-89-8, CAS Number 187674-70-0 and mixtures thereof.

6. The ink set of claim 1, wherein the pigment is a carbon black pigment.

7. The ink set of claim 6, comprising at least four differently colored inks, wherein at least one of the inks is said first ink, and at least three of the inks are, individually, cyan, magenta and yellow second inks.

8. A method for ink jet printing onto a substrate, comprising the steps of:
    (a) providing an ink jet printer that is responsive to digital data signals;
    (b) loading the printer with a substrate to be printed;
    (c) loading the printer with an inkjet ink set as set forth in any one of claims 2, 3, 4, 5, 1, 6 or 7; and
    (d) printing onto the substrate using the inkjet ink set in response to the digital data signals.

9. The method of claim 8, wherein the substrate is plain paper.

10. The ink set of claim 1, wherein the amine in the second ink is 1,3-diamino-2-hydroxypropane.

* * * * *